US012596540B2

(12) United States Patent
Atur et al.

(10) Patent No.: US 12,596,540 B2
(45) Date of Patent: Apr. 7, 2026

(54) CLOUD INITIATED BARE METAL AS A SERVICE FOR ON-PREMISES SERVERS

(71) Applicant: Rakuten Symphony, Inc., Tokyo (JP)

(72) Inventors: Sree Nandan Atur, Newark, CA (US); Ravi Kumar Alluboyina, Santa Clara, CA (US)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/251,052

(22) PCT Filed: Nov. 29, 2022

(86) PCT No.: PCT/US2022/051209
§ 371 (c)(1),
(2) Date: Apr. 28, 2023

(87) PCT Pub. No.: WO2024/118056
PCT Pub. Date: Jun. 6, 2024

(65) Prior Publication Data
US 2025/0278258 A1 Sep. 4, 2025

(51) Int. Cl.
| | |
|---|---|
| *H04L 29/08* | (2006.01) |
| *G06F 8/61* | (2018.01) |
| *G06F 21/31* | (2013.01) |
| *H04L 29/06* | (2006.01) |
| *H04L 41/40* | (2022.01) |

(52) U.S. Cl.
CPC .............. *G06F 8/61* (2013.01); *G06F 21/31* (2013.01)

(58) Field of Classification Search
CPC ........ G06F 8/61; G06F 21/31; G06F 9/45558; G06F 9/45541; G06F 2009/45595
See application file for complete search history.

(56) References Cited

U.S. PATENT DOCUMENTS

| | | | |
|---|---|---|---|
| 8,332,496 B2 | 12/2012 | Gopalakrishnan | |
| 10,148,496 B2 * | 12/2018 | Tiwari | ............... H04L 41/0895 |
| 10,153,943 B2 | 12/2018 | Mulligan | |
| 10,425,229 B2 | 9/2019 | Mueller | |
| 10,454,931 B2 | 10/2019 | Hinaman | |
| 10,678,567 B2 | 6/2020 | Rykowski | |
| 11,397,588 B2 | 7/2022 | Hudson | |
| 2009/0144514 A1 | 6/2009 | Lamantia | |
| 2010/0192145 A1 | 7/2010 | Liles | |
| 2011/0302400 A1 | 12/2011 | Maino | |
| 2014/0181493 A1 | 6/2014 | Deal | |
| 2014/0359599 A1 * | 12/2014 | Liao | .......................... G06F 8/61 |
| | | | 717/174 |
| 2018/0131579 A1 * | 5/2018 | Jacobs | .................. H04L 41/022 |
| 2020/0106744 A1 * | 4/2020 | Miriyala | .............. H04L 43/026 |
| 2020/0278915 A1 | 9/2020 | Degaonkar et al. | |

(Continued)

*Primary Examiner* — S. Sough
*Assistant Examiner* — Mohammad H Kabir
(74) *Attorney, Agent, or Firm* — David R. Stevens; Stevens Law Group

(57) ABSTRACT

Systems and methods for remotely configuring a bare metal server located on-premises. A method includes registering a bare metal server with a cloud native platform, wherein the bare metal server is located on-premises at a client location and remotely installing an operating system on the bare metal server. The method includes causing the bare metal server to install the operating system on a plurality of other bare metal servers located on-premises at the client location.

20 Claims, 16 Drawing Sheets

(56)                    References Cited

U.S. PATENT DOCUMENTS

| | | | |
|---|---|---|---|
| 2020/0344326 A1* | 10/2020 | Ghosh | ................. G06F 9/45558 |
| 2021/0271506 A1* | 9/2021 | Ganguly | ................. H04L 41/04 |
| 2022/0171648 A1 | 6/2022 | Rodriguez et al. | |
| 2022/0200998 A1* | 6/2022 | Sudhakaran | ............ H04L 63/20 |
| 2022/0345362 A1* | 10/2022 | Hullahalli | ........... H04L 41/0883 |
| 2024/0039825 A1* | 2/2024 | Liu | .................... H04L 41/0816 |

* cited by examiner

300

400

Bare Metal Server 902

Distributed File Store 522

Images 904

Artifacts 906

Cluster 518

Machine Initialization Module 118

Worker 516

Workflow Orchestrator 506

1000

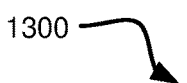

1300

Registering A Bare Metal Server With A Cloud Native Platform, Wherein The Bare Metal Server Is Located On-Premises At A Client Location. 1302

Remotely Installing An Operating System On The Bare Metal Server Without Communicating With Any Of A DHCP Server, TFTP Server, Or HTTP Server At The Client Location. 1304

Remotely Installing A Containerized Workload Management System On The Bare Metal Server Without Communicating With Any Of A DHCP Server, TFTP Server, Or HTTP Server At The Client Location. 1306

Remotely Installing A Software Package For A Multi-Data Center Automation Platform On The Bare Metal Server Without Communicating With Any Of A DHCP Server, TFTP Server, Or HTTP Server At The Client Location. 1308

Causing The Bare Metal Server To Install The Operating System On A Plurality Of Other Bare Metal Servers Located On-Premises At The Client Location. 1310

FIG. 13

CLOUD INITIATED BARE METAL AS A SERVICE FOR ON-PREMISES SERVERS

TECHNICAL FIELD

This disclosure relates generally to configuring network systems and specifically relates to provisioning bare metal servers.

SUMMARY

Systems and methods for provisioning a bare metal server and onboarding a new client. A method includes registering a bare metal server with a cloud native platform, wherein the bare metal server is located on-premises at a client location and remotely installing an operating system on the bare metal server. The method includes causing the bare metal server to install the operating system on a plurality of other bare metal servers located on-premises at the client location.

BACKGROUND

Numerous industries benefit from and rely upon cloud-based computing resources to store data, access data, and run applications and tasks based on the stored data. These systems often rely on storage and processing resources of numerous bare metal servers. In traditional systems, it is computationally expensive and time consuming to install an operating system on a new bare metal server and configure the new bare metal server for use. Additionally, these traditional systems require that software be installed directly on-site to provision a new bare metal server.

In view of the foregoing, disclosed herein are systems, methods, and devices for reducing the storage, time, and compute resources required to provision a new bare metal server and onboard a new data client.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 13 is a schematic flow chart diagram of a method for provisioning a bare metal server.

DETAILED DESCRIPTION

Disclosed herein are systems, methods, and devices for installing end-to-end orchestration software on the cloud such that the end-to-end orchestration software may be used to orchestrate bare metal servers either on-premises at a client location or across a virtual private network (VPN) zone with no external software footprint. The systems, methods, and devices described herein may specifically be implemented on client bare metal servers located on-premises and protected through VPN access. These on-premises bare metal servers are stacked with no software installed. The systems, methods, and devices described herein are implemented to provision the on-premises bare metal servers with an operating system without installing any software at the customer site.

In traditional systems, a multi-data center automation platform (MDCAP) bare metal as a service (BMaaS) as described herein must first be locally installed on a client's on-premises bare metal server in communication with a cloud native platform (CNP). The on-premises bare metal server is used to bring up the MDCAP and associated repository manager. This on-premises MDCAP may then be used to provision other bare metal servers. Thus, traditional systems require that customers have at least two bare metal servers to utilize the functionality of the MDCAP BMaaS.

The systems, methods, and devices described herein move BMaaS functionality to the cloud. This enables a cloud-based instance of the MDCAP to orchestrate other bare metal servers without locally installing the MDCAP software package on the client's on-premises bare metal server. This obviates the need to have the MDCAP software package running on-premises. When the MDCAP is managed on the cloud, the client's bare metal servers can be provisioned directly from a remote location. In the systems, methods, and devices described herein, a client must only provide one bare metal server with relevant details and a virtual private network (VPN) connection enabling communication with the bare metal server.

A method described herein includes registering a bare metal server with a cloud native platform, wherein the bare metal server is located on-premises at a client location and remotely installing an operating system on the bare metal server. The method includes remotely installing a software package for multi-data center automation platform on the bare metal server. The method includes causing the bare metal server to install the operating system on a plurality of other bare metal servers located on-premises at the client location by instructing the bare metal server to execute the software package for the multi-data center automation platform. The method is executed without communicating with any of a DHCP server, TFTP server, or HTTP server located at the client location.

Figure 1:
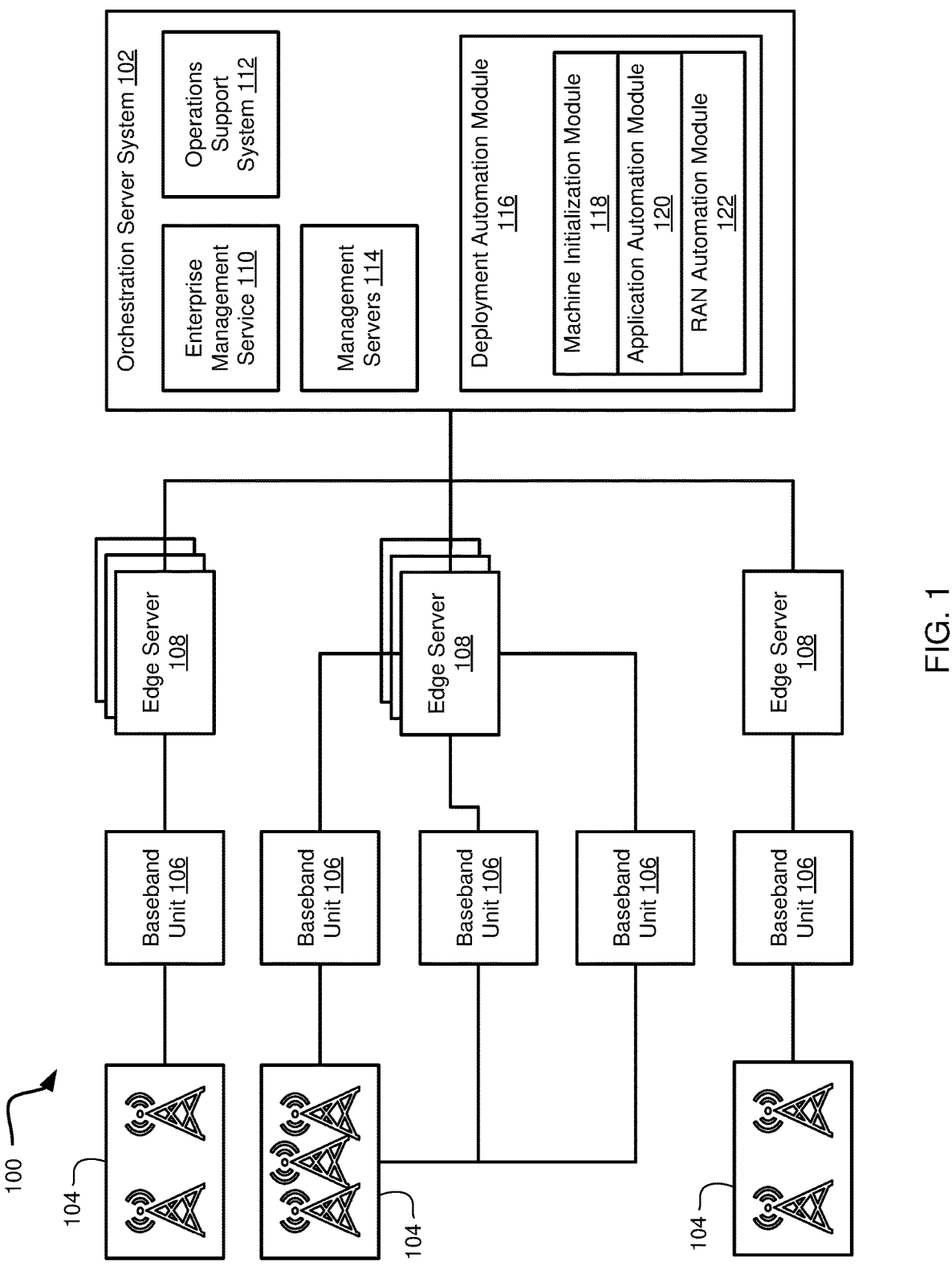
FIG. 1 is a schematic illustration of a network environment in which the systems and methods described herein may be used.

Referring now to the figures, FIG. 1 is a schematic illustration of a network environment 100 in which the systems and methods disclosed herein may be used. The network environment 100 includes a plurality of baseboard units (BBUs) 106 and edge servers 108 in communication with various antennas 104. The edge servers 108 comprise processing and memory resources configured to execute an orchestration server system 102. The orchestration server system 102 includes an enterprise management service 110, operations support system 112, management server 114, and a deployment automation module 116.

The antennas 104 are coupled to the baseband units 106. The baseboard units 106 provide translation between radio frequency signals received from the antennas 104 and digital data received from the edge servers 108. Each baseboard unit 106 may perform this translation according to applicable cellular wireless data protocols. The edge servers 108 are coupled to the orchestration server system 102 either directly or by way of one or more intermediary servers.

The orchestration server system 102 executes centralized management services used to manage the edge servers 108 and baseboard units 106. Specifically, the orchestration server system 102 executes enterprise management services 110, operations support systems (OSS) 112, and one or more management servers 114 for services implemented on the edge servers 108. The orchestration server system 102 executes a deployment automation module 116 that facilitates deployment of the baseboard units 106, the edge servers 108, and the services executing on the baseboard units 106 and the edge servers 108.

The deployment automation module 116 includes a machine initialization module 118 that detects and initializes hardware within the network environment 100. The hardware may include computing and storage devices for implementing the baseboard units 106 or the edge servers 108. For example, given a computing device configured with an IP address, the machine initialization module 118 may initialize the BIOS (basic input output system), install an operating system, configure the operating system to connect to a network and to the orchestration server system 102, and install an agent for facilitating installation of services and for performing management functions on the computing device at the instruction of the deployment automation module 116. For example, the machine initialization module 118 may use COBBLER in order to initialize the computing device.

The machine initialization module 118 may also discover computing devices on a network and generate a topology of the devices, such as in the form of a directed acyclic graph (DAG). The deployment automation module 116 may then use this DAG to select computing devices for implementing network services and in order to configure a machine to receive installation of a network service.

The deployment automation module 116 may include an application automation module 120 that automates the deployment of an application, such as a container executing an application on a computing device. The application automation module 120 may implement methods and systems described below relating to the automated deployment and management of applications.

One example application of the systems and methods disclosed herein is a radio area network (RAN) automation module 122 that performs the automated deployment of a network service in the illustrated network environment, including instantiating, configuring, and managing services executing on the baseboard units 106, the edge servers 108, and the orchestration server system 102 in order to implement a RAN in a one-click automated fashion.

Figure 2:
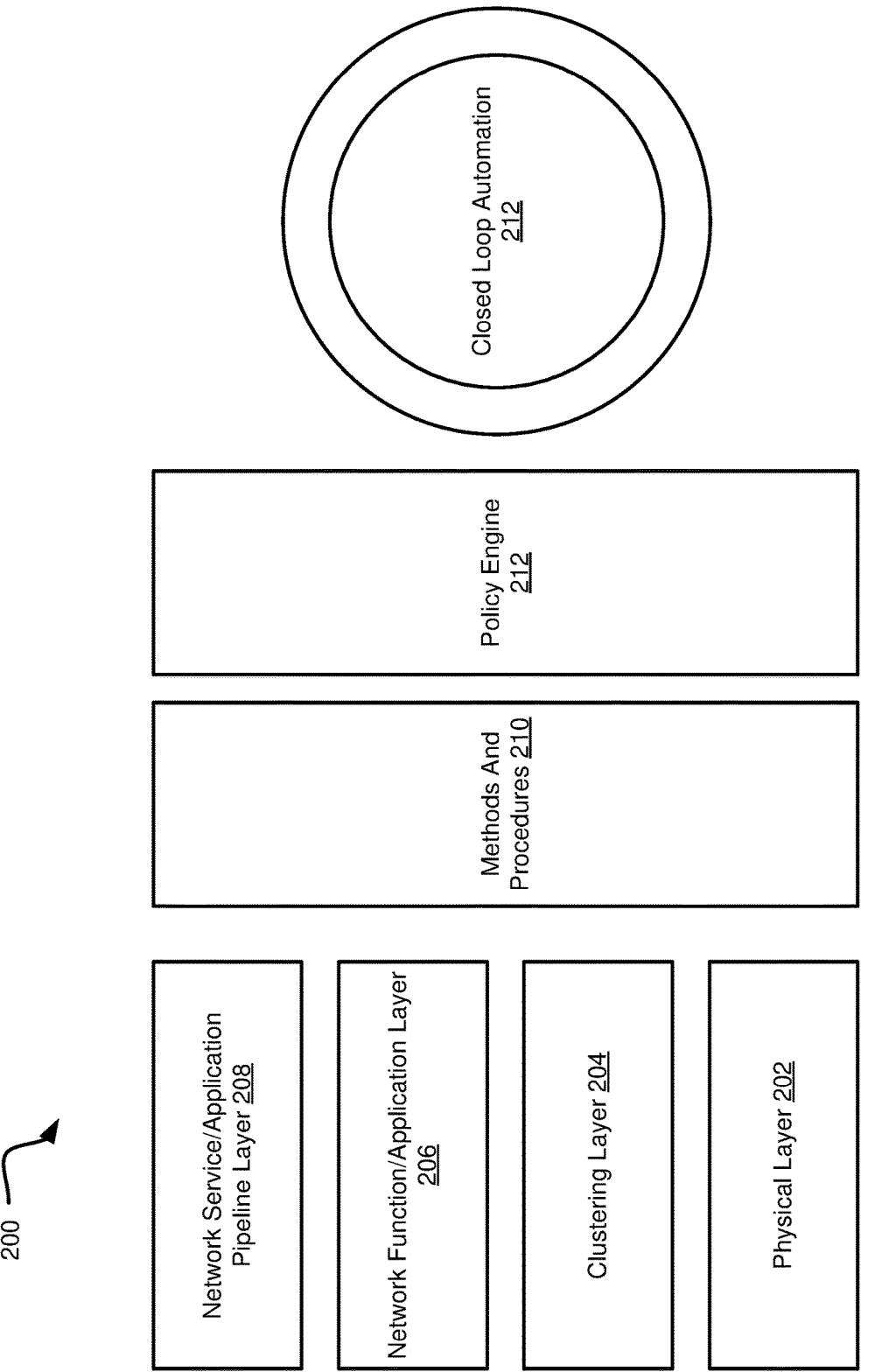
FIG. 2 is a schematic block diagram of a system comprising layers for external management of a network service.

FIG. 2 is a schematic block diagram of a system 200 comprising layers for external management of a network service. The system 200 includes a physical layer 202, clustering layer 204, network function/application layer 206, and a network service/application pipeline layer 208.

The physical layer 202 includes computing hardware and may further include basic software such as BIOS, firmware, an operating system, or even a virtual machine executing on the computing hardware. The system includes the clustering layer 204 residing on the physical layer 202. The clustering layer 204 includes data structures and software that enables a group of computing devices to act as a cluster. A cluster may be defined as a group of devices that are backups of one another, that provide a service with requests for that service being distributed among devices of the cluster according to a load balancing approach, that together implement a plurality of distinct applications that cooperate with one another to implement a service, or that are associated to one another for a common purpose or according to an arbitrary cluster definition of an administrator. The clustering layer 204 may be implemented by agent software executing on the physical layer 202 that coordinates with the deployment automation module 116 and other devices of a cluster.

The network function/application layer 206 includes applications executing on the computing devices of a cluster that individually or together with other applications executing on other nodes of the cluster implement a network service, such as access to a database, web server, or other server-based computational function that may be provided as a service to a user or another service of a network environment 100. The network service/application pipeline layer 208 may include a pipeline of network functions/applications 206 that communicate with one another to implement a more complex network service.

The operations of the layers 202-208 is managed by method and procedures (MOPs) 210 that are independent of the services implemented by the layers and include management functions such as instantiating, upgrading, health checks, monitoring power, restarting, replacing, scaling, and shutting down of the entities implementing a layer 202-208 (also referred to as life cycle management (LCM)).

The system 200 includes a policy engine 212 configured to provide logic that defines actions performed by any of the layers 202-208. These actions include, for example, procedures for implementing backups, procedures for handling faults at a particular layer, procedures for prioritization of individual MOPs 210, or other policies that an administrator may wish to impose on the operation of any of the layers 202-208.

For example, the policy engine 212 may have access to a topology of an application pipeline created according to the methods disclosed herein. Once a fault is identified, the policy engine 212 may implement an appropriate recovery policy. For example, if a computing device fails, its IP address may be released and assigned to a new computing device. The elements on the failed computing device may be instantiated on a new computing device assigned the IP address. If an element fails, a new element of the same type may be instantiated and configured to take its place. If a pod fails, a new pod may be created and configured to take its place.

The system 200 includes closed loop automation 214 that is executed in connection with any of the layers 202-208.

The closed loop automation 214 may specifically include the performance of tasks, verification of performance of tasks, monitoring function, automated actions performed in response to states detected during monitoring, and other actions in order to implement some or all of the layers 202-208 and maintain operation of the layers 202-208.

Figure 3:
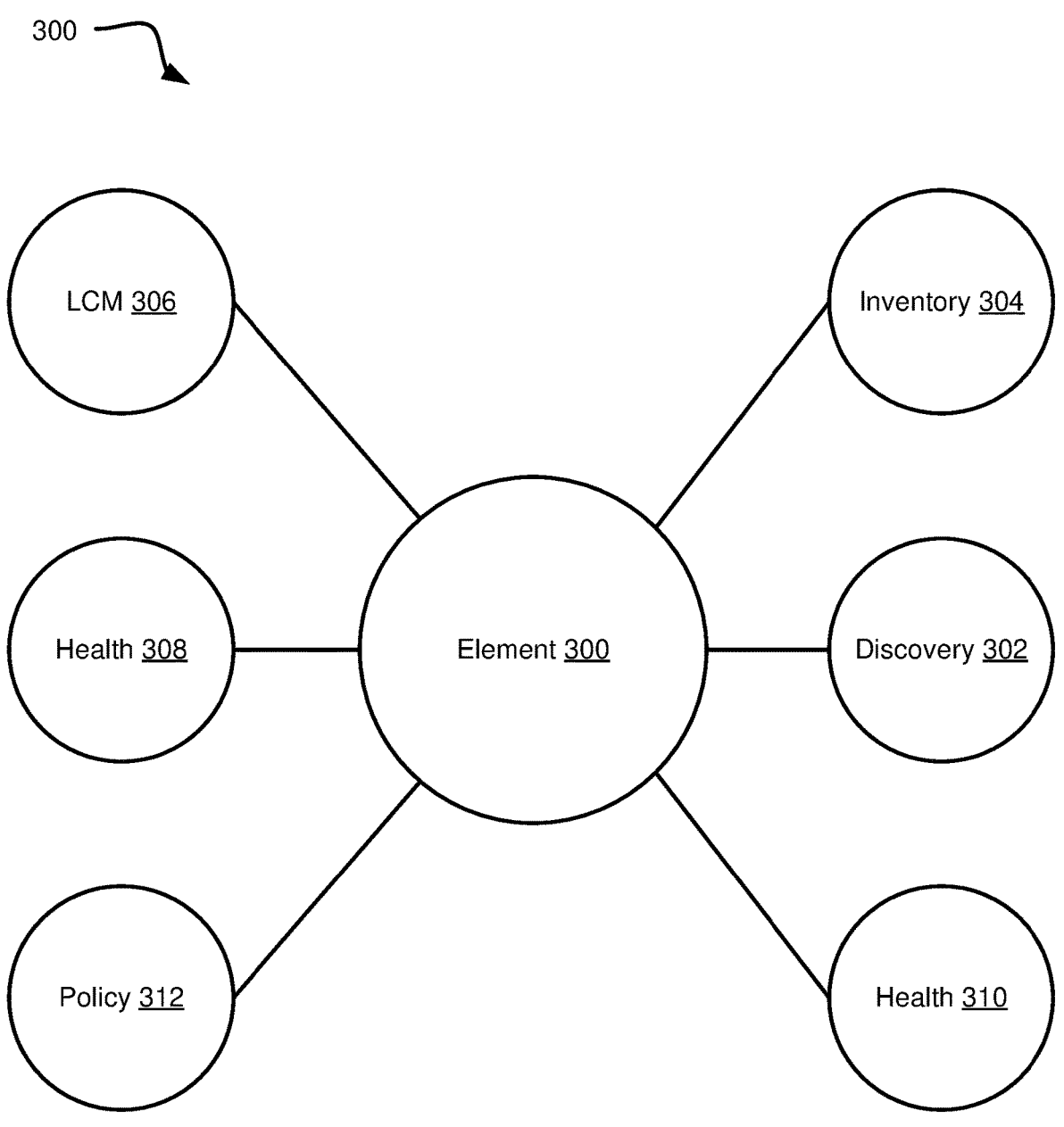
FIG. 3 is a schematic diagram of an element of a network service.

FIG. 3 is a schematic diagram of an element 300 of a network service in accordance with an embodiment of the present invention. Each entity that constitutes one of the layers 202-208 may be embodied as an element 300. Each element 300 defines functions and interfaces used by the deployment automation module 116 to deploy and manage an entity represented by an element 300. An element 300 may be an entity that is a combination of sub-elements and defines functions and interfaces for deploying and managing the combination of sub-elements. Accordingly, the deployment automation module 116 may invoke these interfaces and functions in order to deploy and manage an element 300 without requiring any modification of the deployment automation module 116 to adapt to or have data describing the entity represented by the element 300.

For example, an element 300 may define functions and interfaces for discovering 302 the element 300 such that once the element 300 is connected by a network to the deployment automation module 116, the element 300 may be discovered and its identity, type, and other attributes may be provided to the deployment automation module 116.

The element 300 may define functions and interfaces for maintaining a reference to the element 300 in an inventory 304 of elements 300 maintained by the deployment automation module 116. This may include responding to queries from the deployment automation module 116 with responses indicating availability of the element 300, e.g., whether it is assigned and operational.

The element 300 may define functions and interfaces for performing life cycle management (LCM) 306 of the element 300. This may include functions and interfaces for instantiating, upgrading, scaling, restarting, restarting, or de-instantiating the element 300.

The element 300 may define functions and interfaces for performing healing 308 on the element 300. This may include functions and interfaces for detecting faults, recovering from faults, restoring non-functioning parts of the element 300, or other actions for restoring or maintaining function of the element 300.

The element 300 may define functions and interfaces for monitoring health 310 of the element 300. This may include functions and interfaces for running diagnostic checks, performance checks, or other evaluations of the state of operation of the element 300.

The element 300 may define functions and interfaces for implementing policy 312 with respect to the element 300. This may include functions and interfaces for receiving a policy 312 for the element 300 and evaluating the policy 312 with respect to a current state of operation of the element 300. The functions and interfaces may define the policies themselves or may be configured to receive and implement policies received from the deployment automation module 116.

Figure 4:
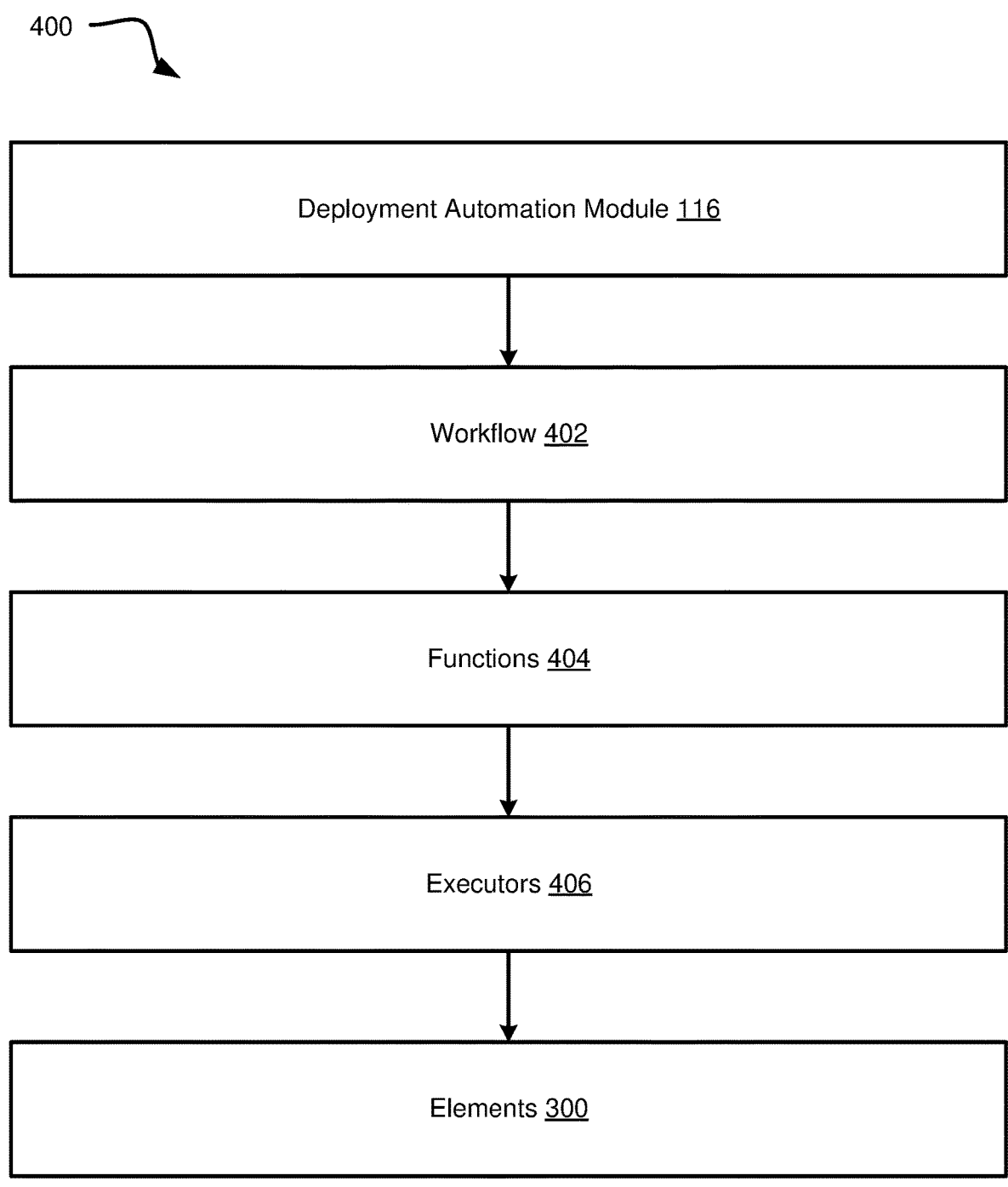
FIG. 4 is a schematic block diagram of a hierarchy for orchestrating a network service.

FIG. 4 is a schematic block diagram of a hierarchy 400 for orchestrating a network service in accordance with an embodiment of the present invention. The deployment automation module 116 may ingest a workflow 402. The workflow 402 defines a series of functions 404 and possibly an order of execution of the functions 404. The functions 404 may invoke executors 406 that operate with respect to an element 300. In particular, the functions 404 may be functions of instances of elements 300 included in the workflow 402. Accordingly, a workflow 402 may be define performance of functions 404 for specific elements 300 and possibly the ordering of these functions.

The elements 300 may be entities implementing a network service pipeline, radio area network (RAN), or any complex multi-application deployment and the workflow invokes the functions of these elements 300. As noted above, due to the abstraction of the elements 300, the workflow does not need to specify entity-specific functions. Instead, tasks of a workflow 402 including discovery, inventory management, life cycle management, health monitoring, healing, policy implementation and other high-level functions may be invoked by invoking corresponding interfaces and functions 302-312 of the elements 300 of the workflow 402.

Figure 5:
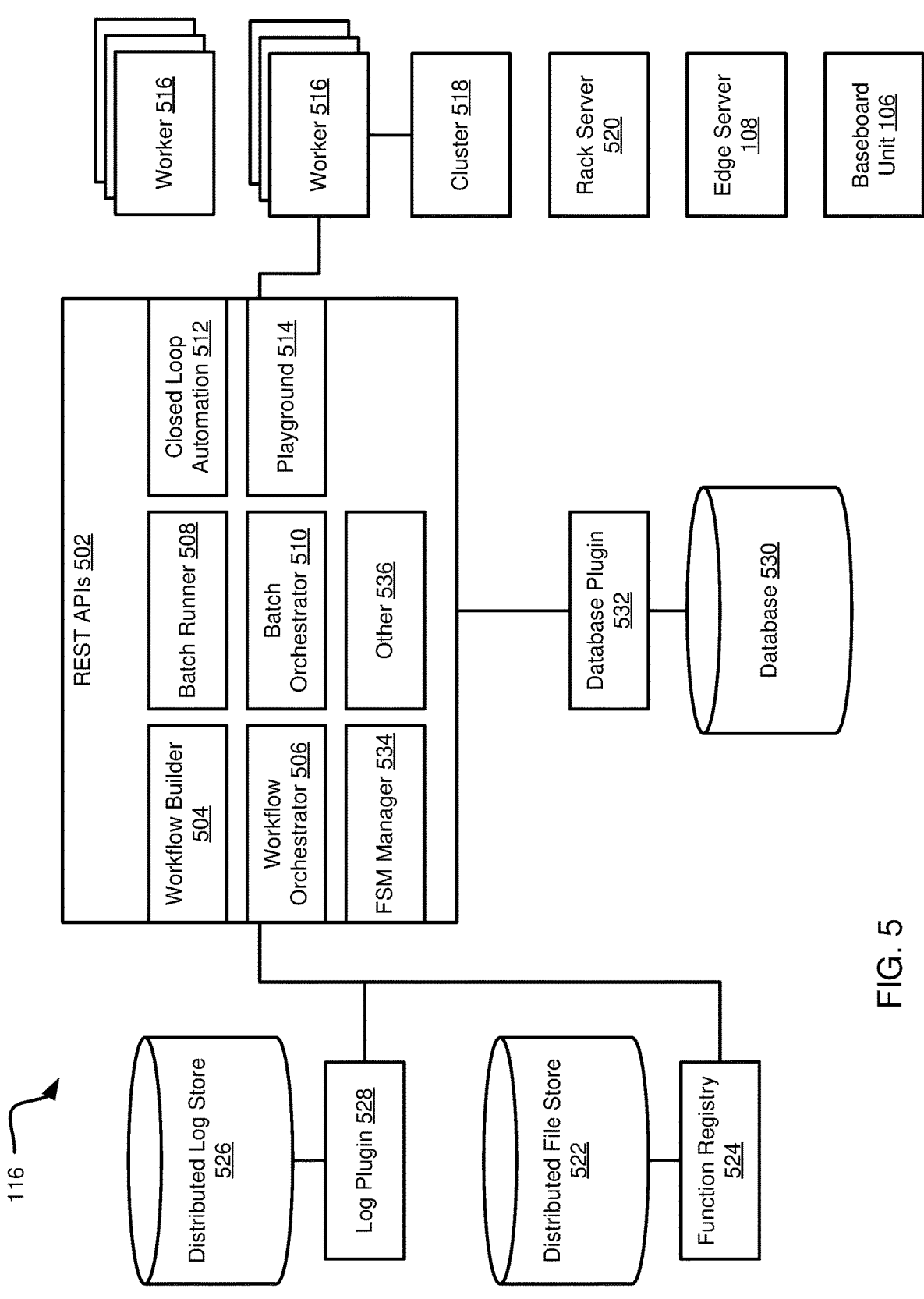
FIG. 5 is a schematic block diagram of a system for executing a deployment automation module of an orchestration server system.

FIG. 5 is a schematic block diagram of a system for executing the deployment automation module 116. The deployment automation module 116 includes a distributed log store 526, a distributed file store 522, and a database 530 in communication with a representation state transfer (REST) application program interface (API) 502. The REST API 502 includes components and software for executing a workflow builder 504, batch runner 508, closed loop automation 512, workflow orchestrator 506, batch orchestrator 510, playground 514, FSM manager 534, and other 536 functionalities.

The workflow builder 504 defines an interface enabling a user to create, select, and modify workflows 402. The workflow orchestrator 506 implements the functions 404 of a workflow 402 on the elements 300 of a workflow 402. In many instances, the number of elements 300 and the functions 404 that are performed with respect to elements 300 is very large, on the order of 1000s or even millions. Accordingly, the batch runner 508 sets up batch processing of functions 404 for elements 300 and a batch orchestrator 510 then executes the functions 404 in batches as defined.

The REST APIs 502 define closed loop automation 512 APIs that implement closed loop automation 214 of the deployment and management of the elements 300 of a workflow 402 according to the interfaces of the elements 300. The playground 514 provides a testbed for the creation and evaluation of elements 300, workflows 402, and functions 404.

The functions 404 of the workflows 402, either individually or as parts of batches, may be implemented by workers 516. The workers 516 may be embodied as pods, such as pods according to the KUBERNETES orchestration platform. Alternatively, workers 516 may be processes or threads of execution executing on one or more computing devices of a network environment 100. For example, the workers 516 may execute on clusters 518, a rack server 520, edge server 108, baseboard unit 106, or some other computing device.

The number of files required to define the functions 404 and elements 300 of a workflow 402 may be very large. Accordingly, a distributed file store 522 may be implemented, such as in the form of a database accessed by means of a function registry 524 that maps a function 404 of an element 300 (e.g., a function identifier associated with an element identifier) to a storage location in the distributed file store 522.

In a like manner, the number of files and amount of data generated by the functions 404 and applications instantiated by a workflow 402 may be very large. Accordingly, a distributed log store 526 may be implemented as a distributed database of log store to which functions 404 and applications instantiated by a workflow 402 may write updates too, such as by means of a log plugin 528.

Other data used by the REST APIs 502 may be stored in a database 530 accessed by means of a database plugin 532. For example, interfaces, templates, pre-defined workflows 402, elements 300, and other data that may be used by a user to define a workflow 404.

In some embodiments, each element 300 may have a state and a corresponding finite state machine that defines transitions between states of the finite state machine in response to events occurring involving the element 300. Accordingly, the REST APIs 502 may include a finite state machine (FSM) manager 534 for managing the state machine of each instance of any of the elements 300.

Other REST APIs 502 may implement other functions, such as observability of elements (OBF), rule-based access control, cluster federation, and other functions that may facilitate implementation and management of a network service pipeline.

Figure 6:
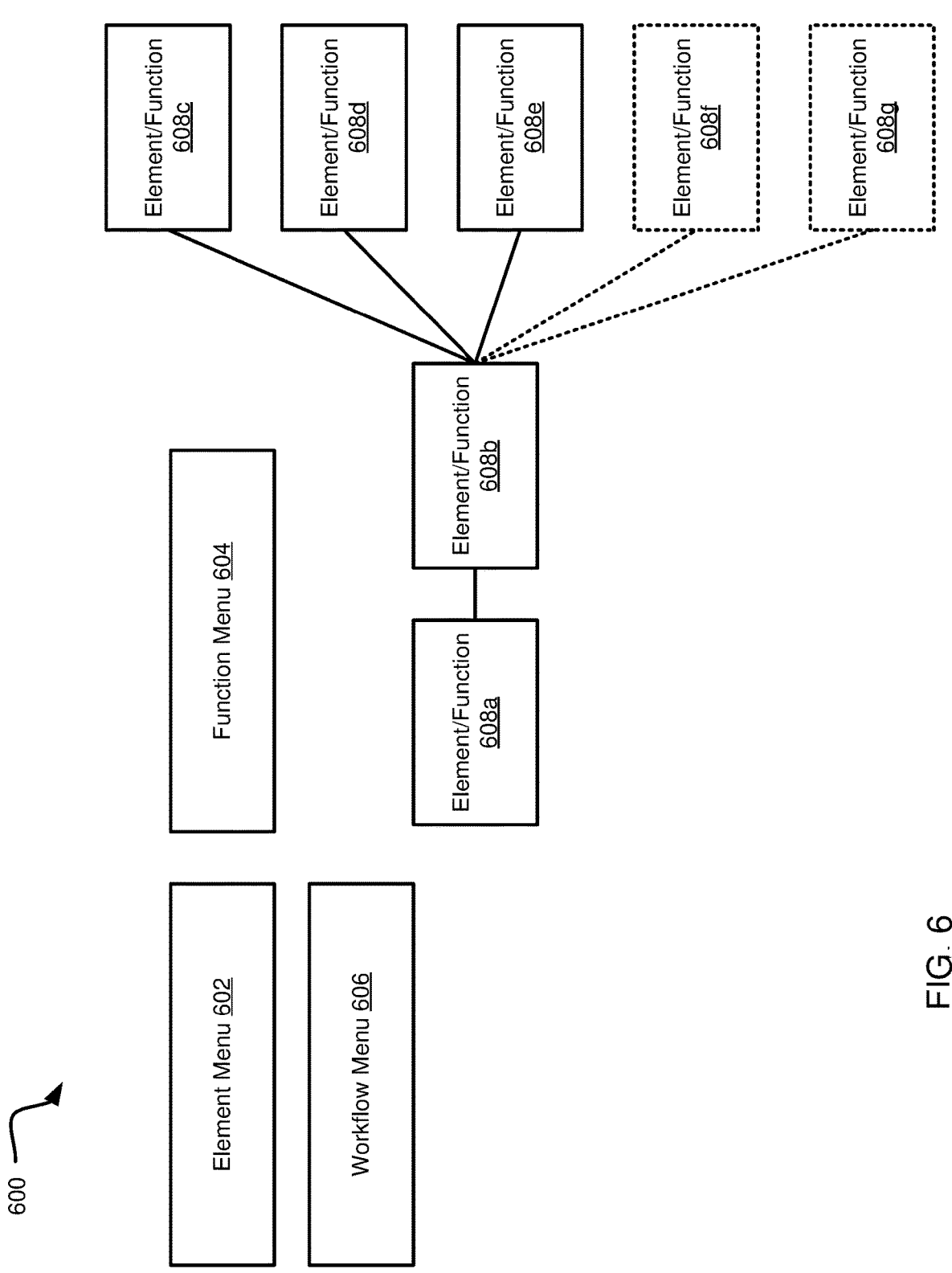
FIG. 6 is a schematic block diagram of an interface that may be provided by a workflow builder to facilitate creating workflows.

FIG. 6 is a schematic block diagram of an interface 600 that may be provided by the workflow builder 504 to facilitate creating workflows 402 in accordance with an embodiment of the present invention. The interface 600 may include an element menu 602 that enables a user to input a selection of an element 300 from a list of available elements 300. Elements 300 may include a virtual machine, a container, a database (e.g., MONGODB), an application, a router, a switch, a rack switch, relay, or any other element that may be needed to implement a network service. The interface may further include a function menu 604 that enables a user to input a selection of an element 300, e.g., the element selected using the element menu 602. This may include any of the interfaces and functions described above. For example, where a workflow 402 is to be created that instantiates a network pipeline, the functions selected from the function menu 604 may be functions to instantiate the selected element. For example, an element/function (i.e., a selected function for a selected element type) 608 may define instantiating a primary manager of a cluster, element/function 6086 may define instantiating a secondary manager of the cluster, element/functions 608c-608e may define instantiating one or more other nodes of the cluster. Other functions for a cluster may include acquiring licenses for software, performing network configuration of the managers and nodes of the cluster, acquiring IP addresses for the cluster and nodes of the cluster, setting up bundles (e.g., bundled applications), and setting up external backup depositories.

Each element/function 608a-608e input by a user may be represented by an icon on the graphical user interface (GUI) 600, such as shown in FIG. 6. Each element function 608a-608e may have configuration parameters such as internet protocol (IP) address, identifier, number of processing cores, amount of memory, amount of storage, etc., to be allocated to the node instantiated by the function 608a-608e. These parameters may be specified by default or may be input by a user, such as by accessing a menu permitting their input by clicking on a representation of a function 608a-608e in the interface 600.

In some embodiments, predefined workflows 402 may be selected from a workflow menu 606. A user may then modify the workflow 402. For example, a workflow selected from the workflow menu 606 or created by a user may be modified to include additional element/functions 608f, 608g.

Figure 7:
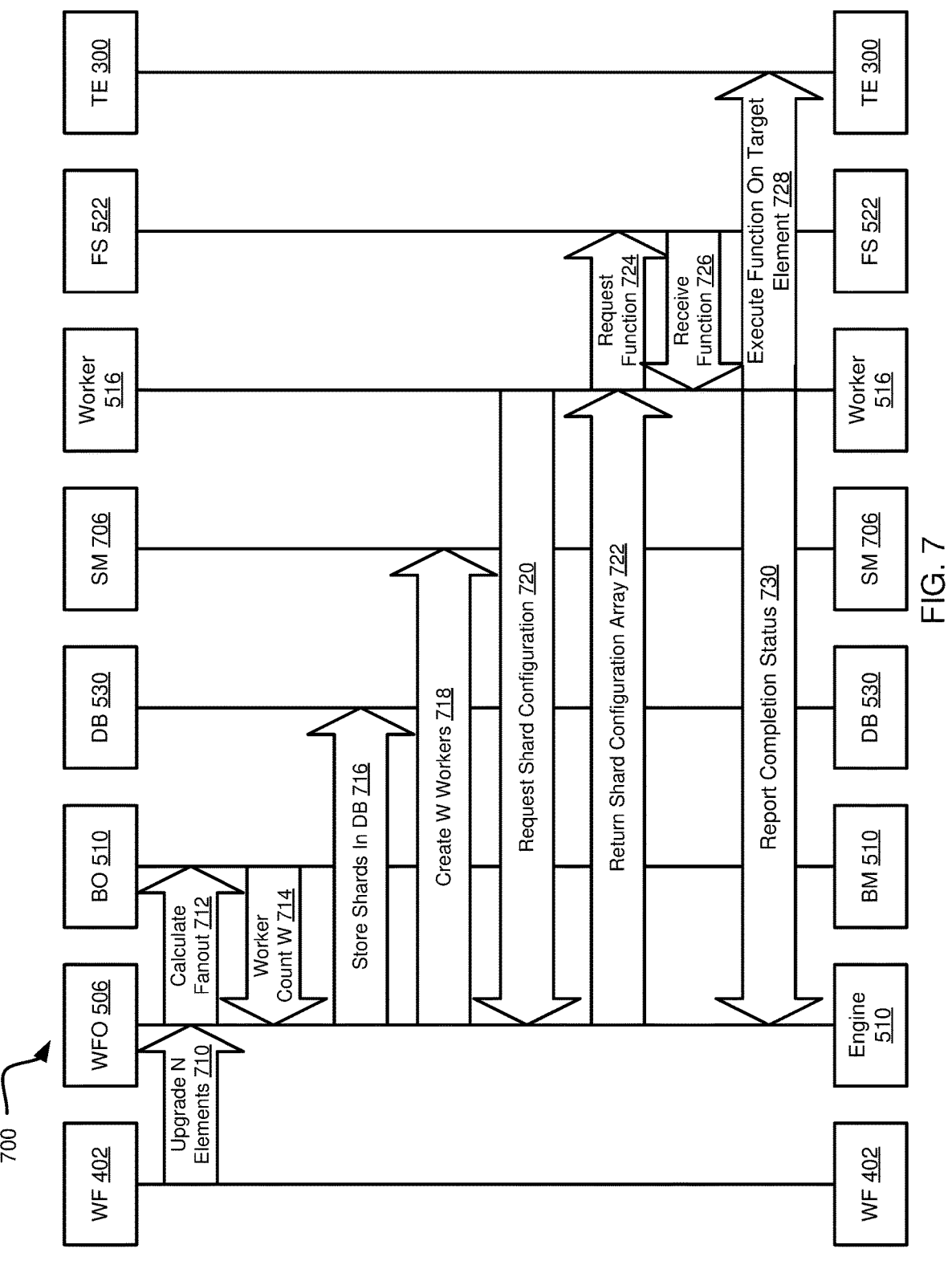
FIG. 7 is a process flow diagram of a method for batch processing functions for large numbers of elements.

FIG. 7 is a process flow diagram of a method 700 for batch processing functions for large numbers of elements in accordance with an embodiment of the present invention.

The method 700 may be performed by the deployment automation module (DAM) 116, such as using the workflow orchestrator (WFO) 506 and batch orchestrator (BO) 510. Various other entities are involved in the method 700, including a workflow (WF) 402, the database (DB) 530, a spawning manager (SM) 706, workers 516, distributed file stores (FS) 522, and a plurality of target elements (TE) 300.

The method 700 includes receiving at 710 an instruction to perform a function with respect to N elements 300. In the illustrated example, this function is upgrading, though any function ascribed herein to an element 300 may also be performed. In a typical application, N is very large, on the order of 1000s, 10,000s, or millions. The instruction received at 710 may be received from a user or received as part of processing a workflow 402.

The workflow orchestrator 506 receives the instruction at 710 and, in response, may calculate at 712 the fanout. This may include determining how many of the target elements 300 will be processed according to the function by a worker 516. The fanout may be static for all types of elements 300, defined for a particular type of element 300, defined for a particular function 302-312, defined for a particular function 302-312 of a particular type of element 300, or be determined based on some other criteria, which may be dynamic, such as a function of the value of N or current loading of workers 516 of the deployment automation module 116.

The batch orchestrator 510 may return at 714 a worker count W that is a number of workers 516 that are available to perform the function with respect to the N target elements 300. The workflow orchestrator 506 may then divide the N target elements 300 into shards such that each shard has approximately (e.g., +/−10) N/W elements 300 assigned to it. Each shard may include element identifiers of the target elements 300 assigned to it and may itself be assigned a shard identifier. The shards may be stored at 716, such as in the database 530.

The workflow orchestrator 506 may then invoke at 718 the creation of W workers. For example, a spawning module 706 may be programmed to generate workers 516 in response to receiving the instruction from step 718. Upon instantiation, the workers may each request 720 a shard from the workflow orchestrator 506, which may then return at 722 a shard configuration array, e.g., an array of target element identifiers along with an identifier of the function to be performed with respect to the target elements 300 referenced by the target element identifiers.

The worker 516 may then request at 724 the function, e.g., a script or executable, corresponding to the function identifier received at step 722, from the distributed file store 522. The worker 516 then receives at 726 the function and executes at 728 the function on each of the target elements 300 reference in the shard configuration array received at step 722. Upon completion of execution of the function with respect to each target element 300 referenced by the shard, the worker 516 reports 730 completion to the workflow orchestrator 506. When all workers 516 complete processing of their shards, the instruction received at step 702 may be complete.

Figure 8:
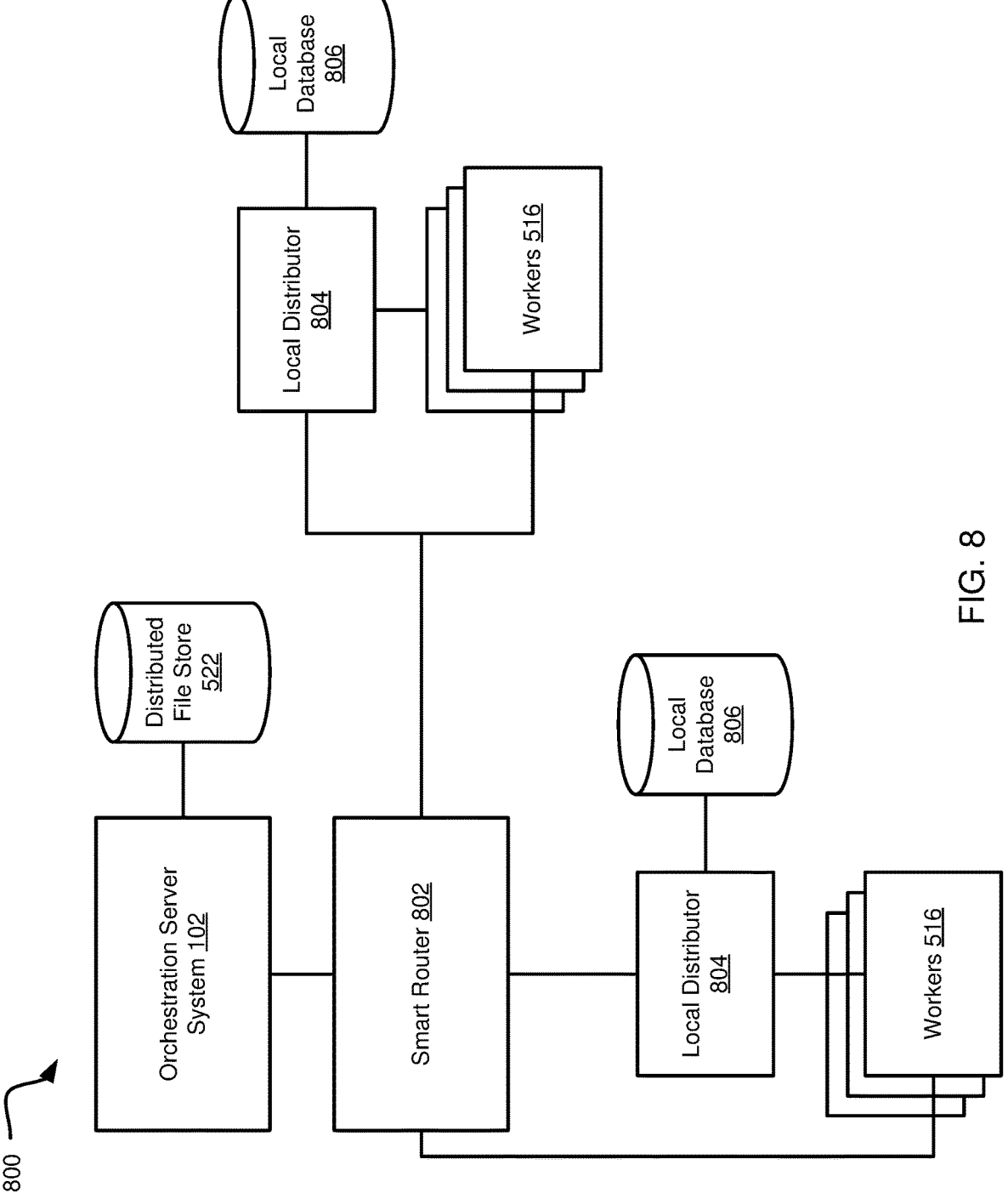
FIG. 8 is a schematic block diagram of a system for distributing files and executing functions of a workflow.

FIG. 8 is a schematic block diagram of a system 800 for distributing files and executing functions of a workflow. The system 800 includes a smart router 802 coupled to various local distributors 804. The local distributors 804 may be embodied as applications executing within pods, e.g., KUBERNETES pods, executing throughout a network environment 100. The distributors 804 may host or access a local database 806. The local database 806 may be a copy of the distributed file store 522 or a portion thereof. For example, given the elements instances in proximity to the local distributor 804, the portion of the distributed file store 522 may include data from the distributed file store 522 relating to those elements, e.g., executables and data for performing the functions of those element instances. Proximity to the local distributor 804 may mean located in the same sub-network or having a network connection to the local distributor 804 having latency below a threshold.

The workers 516 may request data from the distributed file store 522. These requests may be received by the smart routers 802, which identifies the local distributor 804 that is either having the lowest network latency connection to the requesting worker 516 or is more available (i.e., lower latency due to lower loading) to distribute files than the local distributor 804 with lowest network latency. For example, the smart router 802 may include a load balancer 804 as described above with respect to FIG. 8 such that the local distributor 804 is selected according to network latency and loading as described above. The request is then routed by the smart router 802 to the selected local distributor 804, which then provides the requested data to the worker 516 that generated the request.

Figure 9:
FIG. 9 is a schematic block diagram of a system that may be used to implement the functionality of a machine initialization module of an orchestration server system.

FIG. 9 illustrates a system 900 that may be used to implement the functionality of the machine initialization module 118. The machine initialization module 118 may operate with respect to bare metal servers 902 that are "bare metal," i.e., have no operating system, kernel, or other software installed thereon other than firmware stored in non-volatile RAM on the device. This firmware will include a basic input output system (BIOS) as well as firmware on components of the bare metal server 902 such as a network adapter (e.g., network interface card (NIC)), hard disk drive (HDD), solid state drive (SSD), redundant array of independent disks (RAID), just a bunch of disks (JBOD), field programmable gate array (FPGA), baseboard management controller (BMC), Non-Volatile Memory Express (NVME) controller, or other component of the bare metal server 902. Although the foregoing description refers to a bare metal server 902, any computing device, such as a router, switch, endpoint (personal workstation, mobile computing device, internet of things (IOT) device, etc.), or any other computing device that may communicate over a network.

The machine initialization module 118 itself may be structured as an application that may execute on a node of a cluster 518. The machine initialization module 118 may operate on the same cluster 518 or a different cluster from a cluster hosting the workflow orchestrator 506 and one or more workers 516 implementing functions of a workflow being managed by the workflow orchestrator 506 according to the methods described herein.

The machine initialization module 118 accesses the distributed file store 522 to obtain images 904 of operating systems and other executables to be instantiated on a bare metal server 902. The distributed file store 522 may also store artifacts 906 that are likewise executables or other data that are used by the machine initialization module 118 to initialize a bare metal bare metal server 902.

Figure 10:
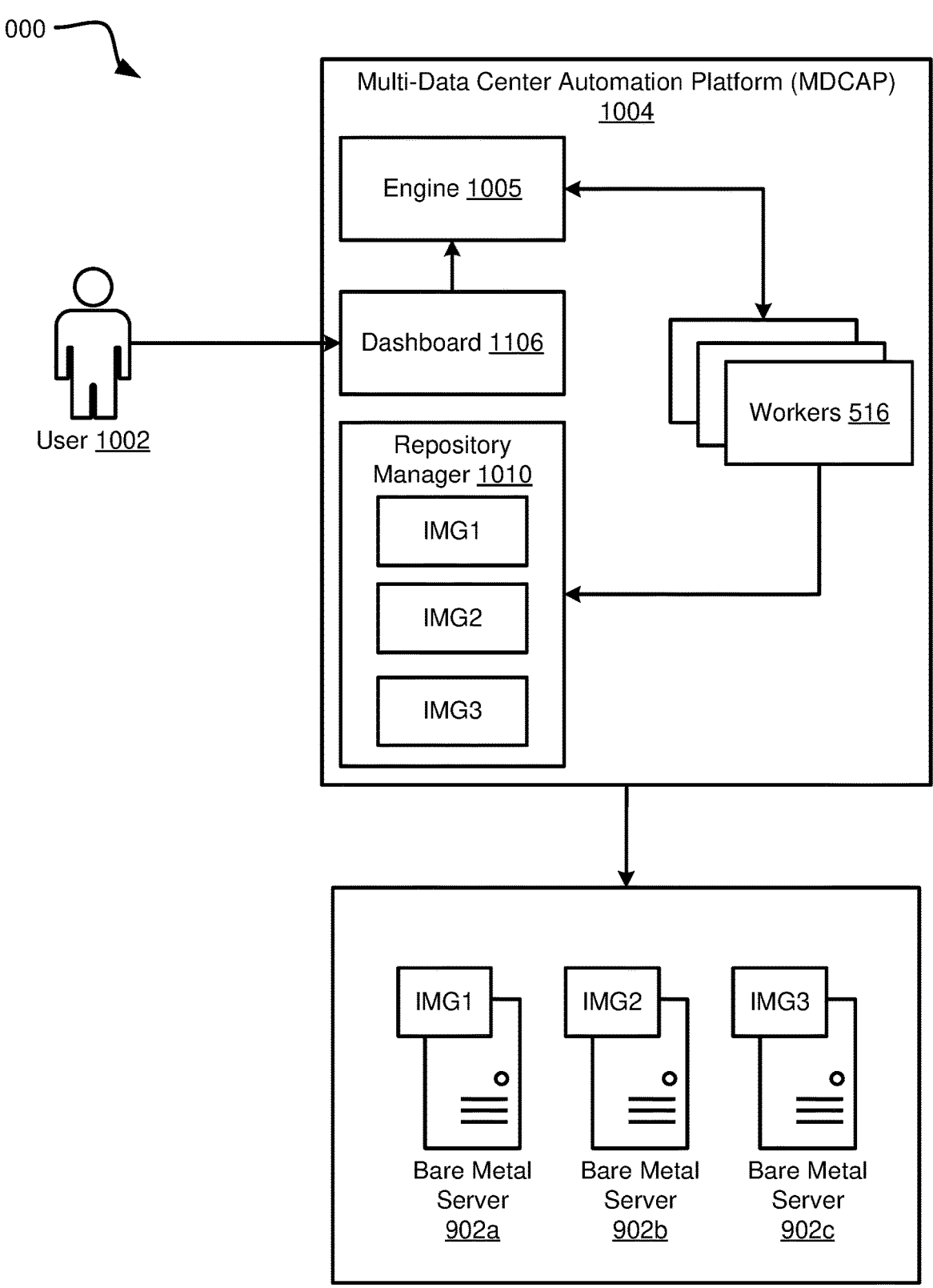
FIG. 10 is a schematic block diagram of a system including a multi-data center automation platform (MDCAP) in communication with a plurality of bare metal servers.

FIG. 10 is a schematic block diagram of a system 1000 for executing a multi-data center automation platform software package. The system 1000 includes the MDCAP 1004 in communication with a user 1002. The MIDCAP 1004 includes an engine 1005 and a dashboard 1006. The MDCAP 1004 renders the dashboard on a user interface 1006 accessible by the user 1002. The MDCAP 1004 includes or communicates with a plurality of workers 516.

The MDCAP 1004 includes or accesses a repository manager 1010 that manages binary resources for the MIDCAP 1004.

The MDCAP 1004 is a hyper automated system for orchestrating and managing the life cycles of bare metal servers, third-party appliances, virtual network functions, cloud native network functions, and service chains. The MDCAP 1004 includes a built-in logging, monitoring, and policy engine for closed loop automation. The MIDCAP 1004 enables the user 1002 to initiate one-click application and network function onboarding. The MDCAP 1004 accelerates infrastructure and service turnup timelines and reduces integration touchpoints and orchestration silos. The MDCAP 1004 improves performance and utilization of services executed by a containerized workload management system such as a KUBERNETES® platform.

The repository manager 1010 serves as a central hub for integrating with tools and processes to improve automation of the system 1000 and increase system 1000 integrity. In some implementations, the repository manager 1010 is implemented as an ARTIFACTORY. The repository manager 1010 organizes binary resources, including, for example, remote artifacts, proprietary libraries, third-party resources, and so forth. The repository manager 1010 pulls these resources into a single centralized location for a plurality of bare metal servers 902a-902c.

The repository manager 1010 manages and automates artifacts and binaries from start to finish during the application delivery process. The repository manager 1010 enables the option to select from different software build packages, major CI/CD (continuous integration/continuous development) systems, and other development tools. The repository manager 1010 may be implemented within a KUBERNETES containerized system with a DOCKER registry with full REST APIs 502 as discussed herein. The repository manager 1010 supports containers, Helm charts, and DOCKER.

Figure 11:
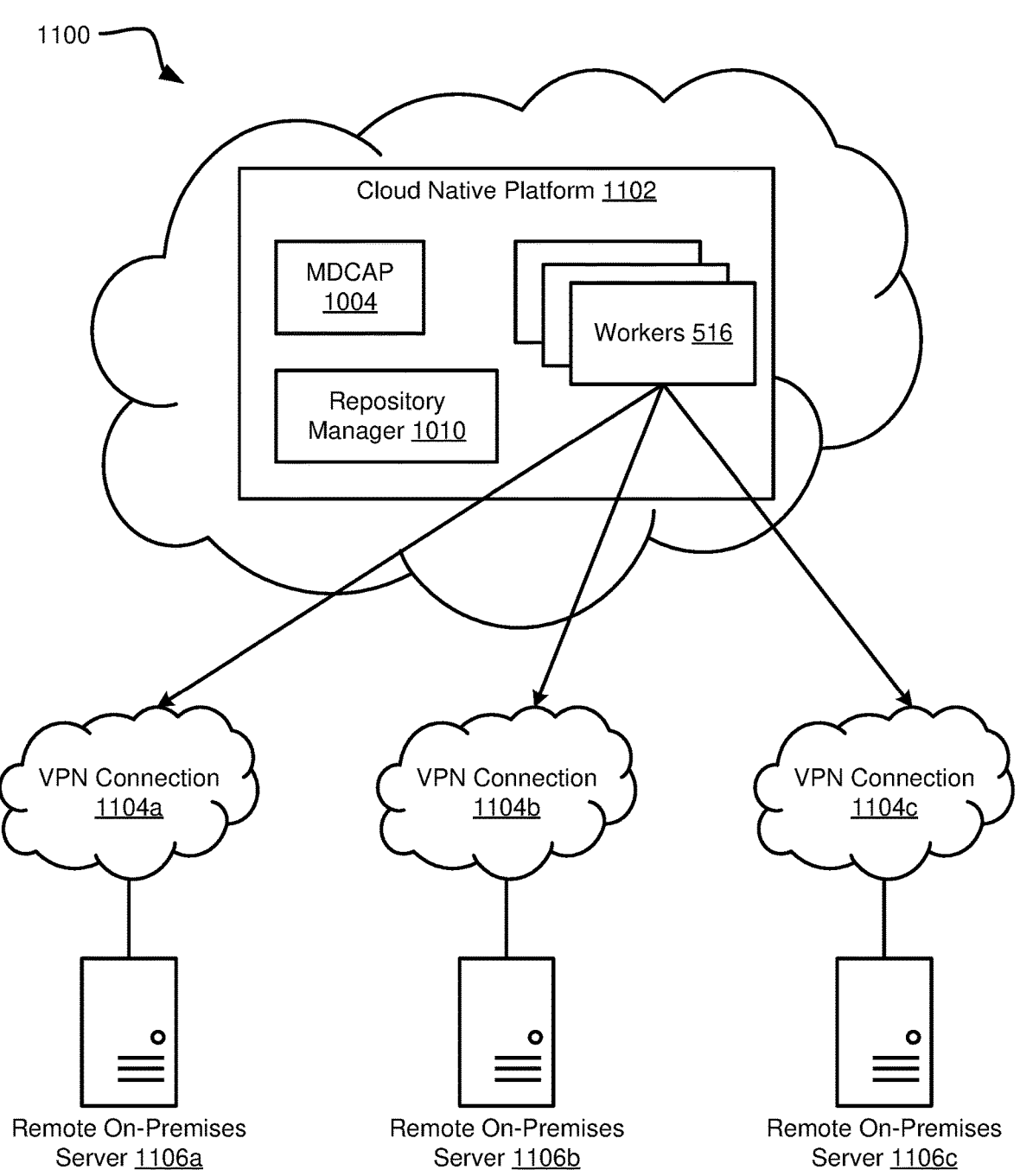
FIG. 11 is a schematic block diagram of a system including a cloud native application running an MDCAP to provision one or more remote on-premises servers.

FIG. 11 is a schematic block diagram of a system 1100 for remotely orchestrating bare metal servers located on-premises at a client location. The system 1100 includes a cloud native platform 1102 comprising a plurality of workers 516 executing an instance of the MDCAP 1004. The cloud native platform 1102 further includes an instance of the repository manager 1010. The workers 516 communicate with a plurality of remote on-premises servers 1106a-1106c by way of dedicated VPN connections 1104a-1104c. The system 1100 enables end-to-end orchestration software like the MDCAP 1004 software package to be installed on the cloud such that the MDCAP 1004 software package may then be executed to orchestrate bare metal servers on-premises or across VPN zones with no external software footprint.

The MDCAP 1004 is installed on a cloud-based instance of computing system. The MDCAP 1004 may be installed on an edge server 108 associated with the orchestration server system 102 described herein. The MIDCAP 1004 may be executed by one or more clusters 518 within a containerized workload management system, such as the KUBERNETES® system described herein. In some implementations, and depending on the client's needs, the MID-CAP 1004 may provide a software as a service (SaaS) solution running on an outside database platform such as Amazon Web Services® or Google Kubernetes Engine®.

The remote on-premises servers 1106a, 1106b, 1106c (may collectively be referred as remote on-premises servers 1106 as described herein) are located remote from the computing resources for the cloud native platform 1102. The remote on-premises servers 1106 are bare metal servers, such as those described at least in connection with FIGS. 9 and 10. The remote on-premises servers 1106 may specifically be located on-premises at a location associated with a client. This is in contrast with a server group managed by an outside entity such as Amazon Web Services® or Google Kubernetes Engine®. Each remote on-premises server 1106 is associated with a client that utilizes the MIDCAP BMaaS functionality executed by the MIDCAP 1004.

The clients associated with the remote on-premises servers 1106 provide the necessary VPN connections 1104a, 1104b, 1104c (may collectively be referred to as a VPN connection 1104 as described herein) to the workers 516 executing the MIDCAP 1004. The VPN connections 1104 enable the workers 516 to reach the corresponding remote on-premises server.

The MDCAP 1004 onboards users with a username and password. A registered user may register a bare metal server (i.e., one of the remote on-premises servers 1106) with the MIDCAP 1004 by providing a baseboard management controller (BMC) IP address, BMC username, BMC password, and VPN credentials for the bare metal server. The user may then instruct the MDCAP 1004 to install on operating system on the bare metal server.

The system 1100 enables a virtually frictionless means to onboard new clients and configure remote on-premises servers 1106 associated with the newly onboarded clients. In traditional systems, the onboarding system must touch the client's DHCP server, TFTP server, and HTTP server to store and serve operation system images. The system 1100 described herein can orchestrate a bare metal server without installing any software at the client's site. The system 1100 enables a simple approach to bringing up the first bare metal server associated with the client (i.e., one of the remote on-premises servers 1106) and configuring end-to-end orchestration software that runs on the first bare metal server to onboard any remaining remote on-premises servers 1106 associated with the client. The remaining remote on-premises servers 1106 are orchestrated directly from the first bare metal server configured for the client. This obviates an enormous amount of data egressing from the cloud and keeps storage, time, and computing costs low.

Figure 12A:
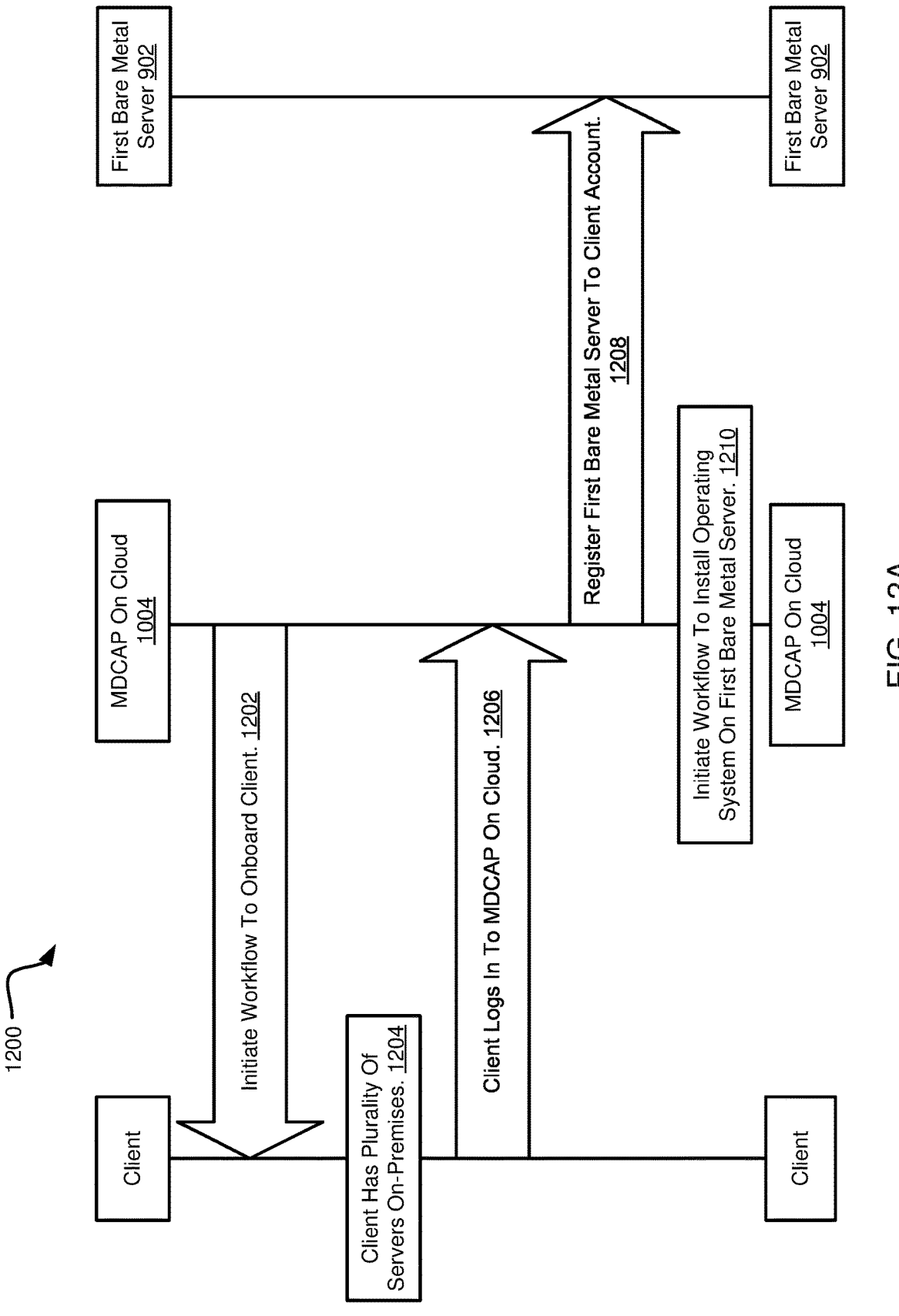
FIGS. 12A-12C are schematic flow chart diagrams illustrating a process flow for provisioning a plurality of on-premises bare metal servers.
Figure 12B:
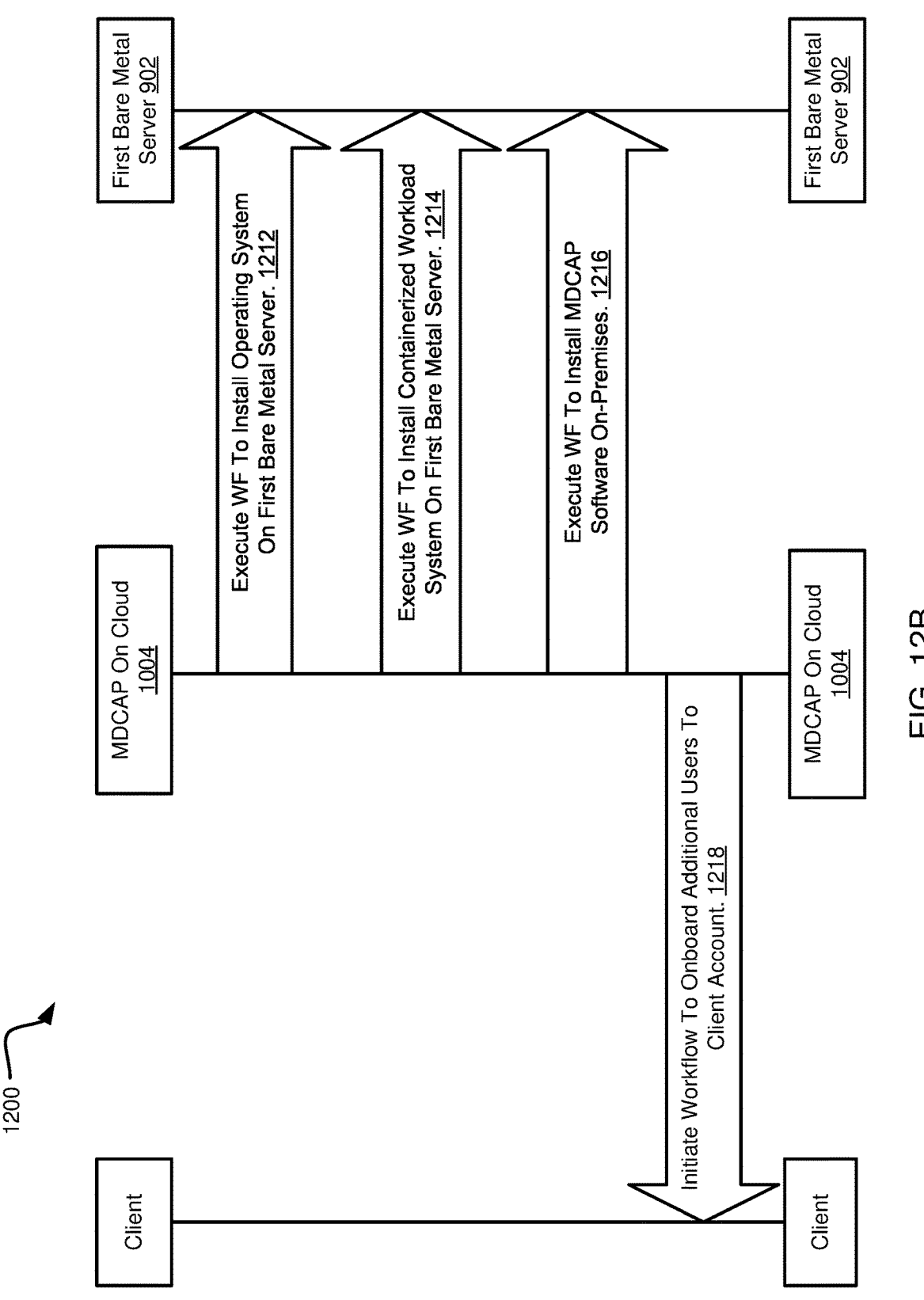
Figure 12C:
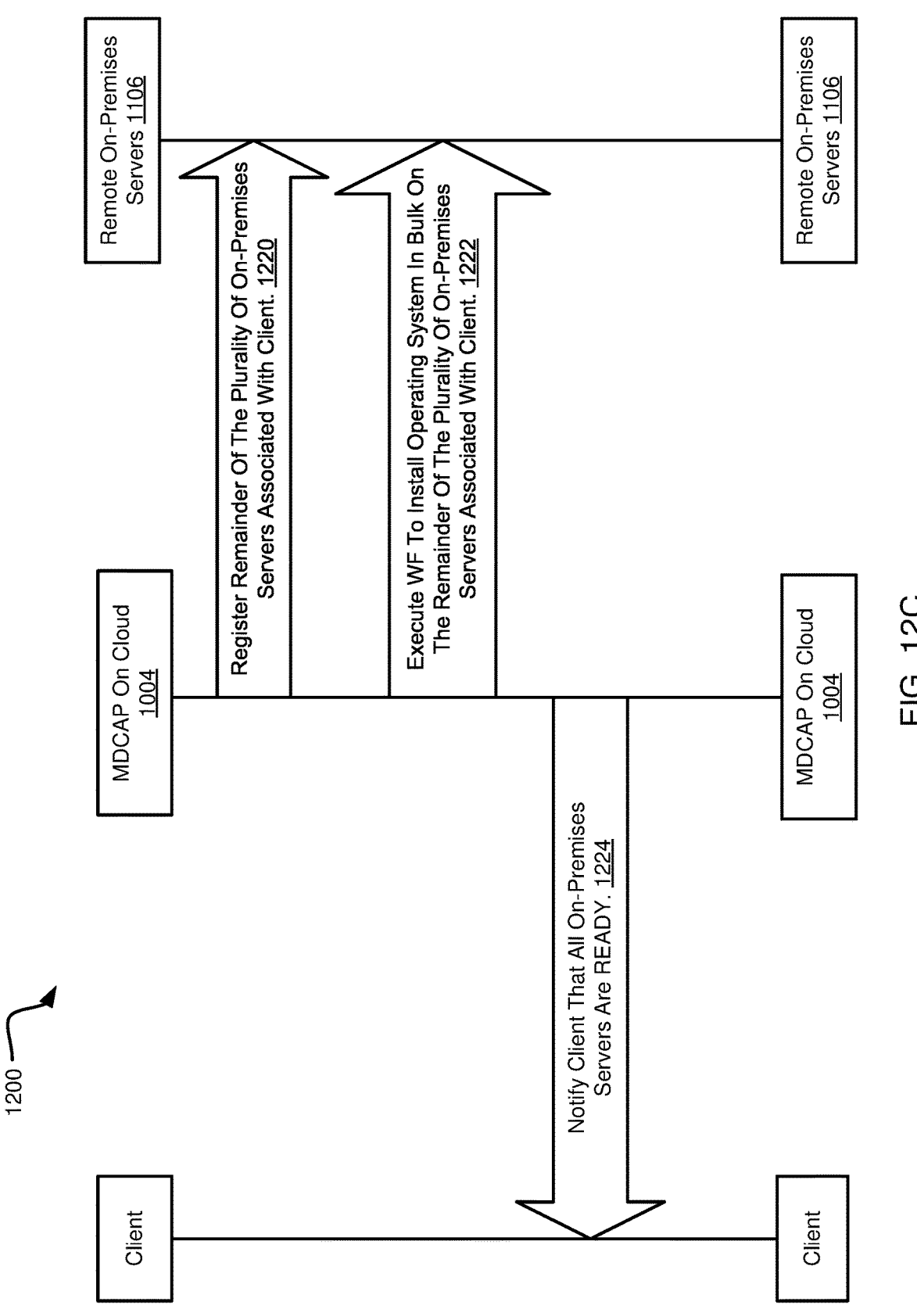

FIGS. 12A-12C are schematic block diagrams of a process flow 1200 for orchestrating bare metal servers located on-premises at a client location, and remote from a cloud-based instance of the MDCAP 1004. The process flow 1200 is executed without installing software directly on the remote on-premises servers 1106 associated with the client. The process flow 1200 enables end-to-end orchestration software like the MDCAP 1004 software package to be installed on the cloud such that the MIDCAP 1004 software package may then be executed to orchestrate bare metal servers on-premises or across VPN zones with no external software footprint.

The process flow 1200 begins and the MIDCAP 1004 instance running on the cloud native platform 1102 initiates a workflow to onboard a client at 1202. The onboarding process includes receiving from the client a unique identifier for the first bare metal server 902, wherein the first bare metal server 902 is located on-premises for the client and remote from the MDCAP 1004. The onboarding processing additionally includes receiving VPN access from the client to access the first bare metal server 902. The onboarding process additionally includes configuring a username and password for a user associated with the client. The process flow 1200 includes determining at 1204 that the client has a plurality of servers located on-premises that need to be provisioned.

The process flow 1200 continues and the client logs into the MDCAP 1004 instance running on the cloud native platform 1102 at 1206. The server group executing the cloud native platform 1102 is located remote from the first bare metal server 902 and any of the other remote on-premises servers 1106 associated with the client. The MDCAP 1004 instance running on the cloud native platform 1120 registers at 1208 the first bare metal server 902 to the client account. The MIDCAP 1004 then initiates a workflow at 1210 to install an operating system on the first bare metal server 902.

The process flow 1200 continues and the MIDCAP 1004 instance running on the cloud native platform 1102 executes a workflow at 1212 to install the operating system on the first bare metal server. The MDCAP 1004 running on the cloud native platform 1102 then executes a workflow at 1214 to install a containerized workload system on the first bare metal server. The containerized workload system may include a KUBERNETES® or similar system as described herein. The process flow 1200 continues and the MDCAP 1004 running on the cloud native platform 1102 executes a workflow at 1216 to install the MIDCAP 1004 software package on-premises on the first bare metal server 902. The MDCAP 1004 may then initiate a workflow at 1218 to onboard additional users to the client account.

The process flow 1200 continues and the MIDCAP 1004 instance running on the cloud native platform 1102 registers at 1220 a remainder of the plurality of remote on-premises servers 1106 associated with the client. The MDCAP 1004 instance then executes a workflow at 1222 to install an operating system in bulk on each of the remaining remote on-premises servers 1106 associated with the client. When the operating system is installed on each of the remote on-premises servers 1106 associated with the client, the MDCAP 1004 may initiate a notification at 1224 to notify the client that the remote on-premises servers 1106 are ready for use.

FIG. 13 is a schematic flow chart diagram of a method 1300 for remotely configuring a bare metal server located on-premises at a client location. The method 1300 may be executed by one or more workers 516 of the cloud native platform 1102 configured to execute the multi-data center automation platform 1004.

The method 1300 begins and the MIDCAP 1004 registers at 1302 a bare metal server with a cloud native platform 1102. The bare metal server is located on-premises at a client location. The MIDCAP 1004 remotely installs at 1304 an operating system on the bare metal server without communicating with any of a DHCP server, a TFTP server, or an HTTP server at the client location. The MDCAP 1004 remotely installs at 1306 a containerized workload management system (such as, for example, KUBERNETES®) on the bare metal server without communicating with any of a DHCP server, a TFTP server, or an HTTP server at the client location. The MDCAP 1004 remotely installs at 1308 a software package for the multi-data center automation platform on the bare metal server without communicating with any of a DHCP server, a TFTP server, or an HTTP server at the client location. The MDCAP 1004 causes at 1310 the bare metal server to install the operating system on a plurality of other bare metal servers located on-premises at the client location.

Figure 14:
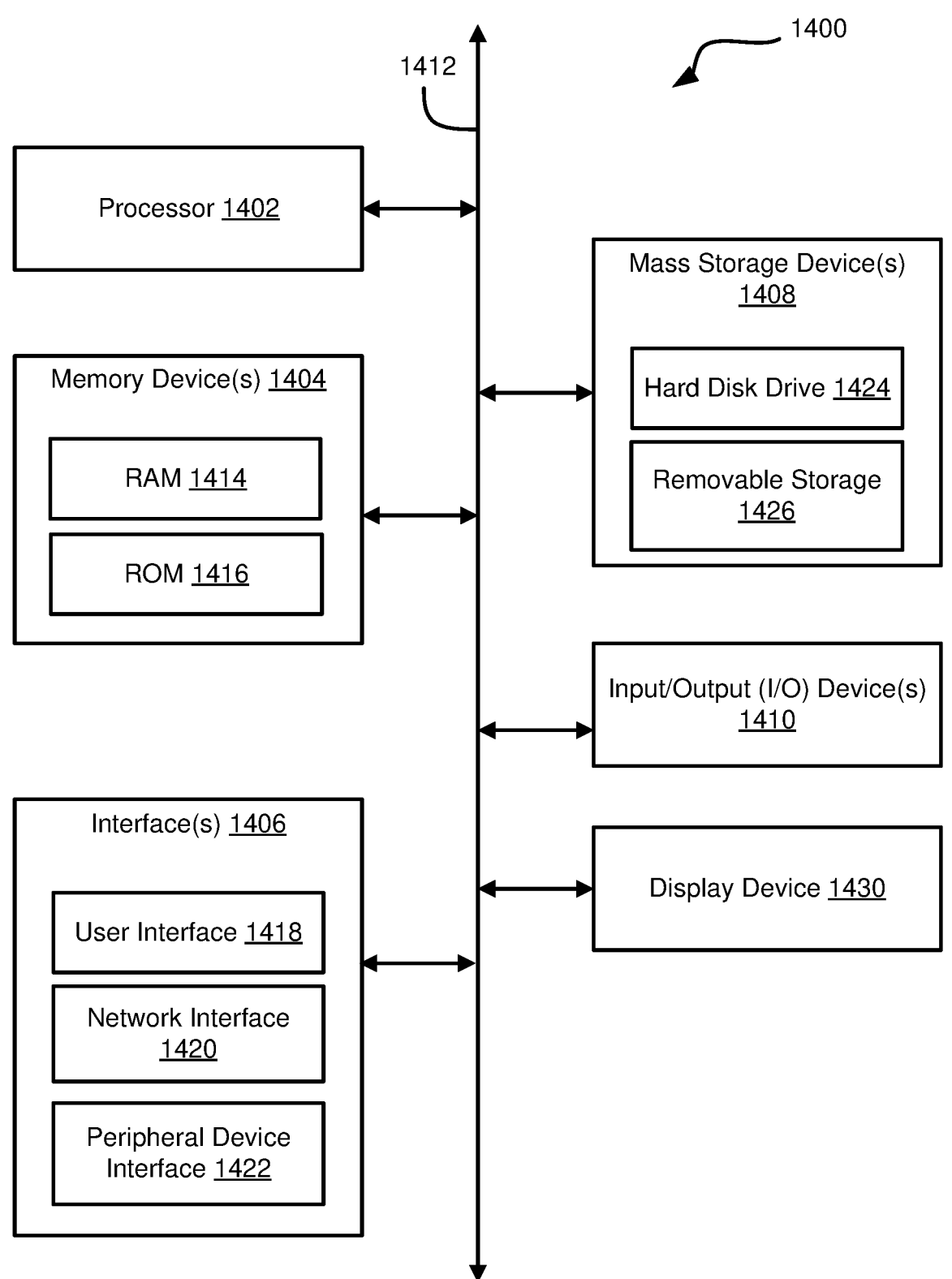
FIG. 14 is a schematic block diagram of an example computing device suitable for implementing methods in accordance with embodiments of the invention.

FIG. 14 illustrates a schematic block diagram of an example computing device 1400. The computing device 1400 may be used to perform various procedures, such as those discussed herein. The computing device 1400 can perform various monitoring functions as discussed herein, and can execute one or more application programs, such as the application programs or functionality described herein. The computing device 1400 can be any of a wide variety of computing devices, such as a desktop computer, in-dash computer, vehicle control system, a notebook computer, a server computer, a handheld computer, tablet computer and the like.

The computing device 1400 includes one or more processor(s) 1404, one or more memory device(s) 1404, one or more interface(s) 1406, one or more mass storage device(s) 1408, one or more Input/output (I/O) device(s) 1410, and a display device 1430 all of which are coupled to a bus 1412. Processor(s) 1404 include one or more processors or controllers that execute instructions stored in memory device(s) 1404 and/or mass storage device(s) 1408. Processor(s) 1404 may also include several types of computer-readable media, such as cache memory.

Memory device(s) 1404 include various computer-readable media, such as volatile memory (e.g., random access memory (RAM) 1414) and/or nonvolatile memory (e.g., read-only memory (ROM) 1416). Memory device(s) 1404 may also include rewritable ROM, such as Flash memory.

Mass storage device(s) 1408 include various computer readable media, such as magnetic tapes, magnetic disks, optical disks, solid-state memory (e.g., Flash memory), and so forth. As shown in FIG. 14, a particular mass storage device 1408 is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, and the like.

Display device 1430 includes any type of device capable of displaying information to one or more users of computing device 1400. Examples of display device 1430 include a monitor, display terminal, video projection device, and the like.

Interface(s) 1406 include various interfaces that allow computing device 1400 to interact with other systems, devices, or computing environments. Example interface(s) 1406 may include any number of different network interfaces 1420, such as interfaces to local area networks (LANs), wide area networks (WANs), wireless networks, and the Internet. Other interface(s) include user interface 1418 and peripheral device interface 1422. The interface(s) 1406 may also include one or more user interface elements 1418. The interface(s) 1406 may also include one or more peripheral interfaces such as interfaces for printers, pointing devices (mice, track pad, or any suitable user interface now known to those of ordinary skill in the field, or later discovered), keyboards, and the like.

Bus 1412 allows processor(s) 1404, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE bus, USB bus, and so forth.

For purposes of illustration, programs and other executable program components are shown herein as discrete blocks, such as block 302 for example, although it is understood that such programs and components may reside at various times in different storage components of computing device 1400 and are executed by processor(s) 1402. Alternatively, the systems and procedures described herein, including programs or other executable program components, can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to preferred features of further embodiments:

Example 1 is a method. The method includes registering a bare metal server with a cloud native platform, wherein the bare metal server is located on-premises at a client location and remotely installing an operating system on the bare metal server. The method includes causing the bare metal server to install the operating system on a plurality of other bare metal servers located on-premises at the client location.

Example 2 is a method as in Example 1, wherein registering the bare metal server comprises registering based on one or more of a baseboard management controller (BMC) Internet Protocol (IP) address, a BMC username, a BMC password, or VPN credentials for the bare metal server.

Example 3 is a method as in any of Examples 1-2, further comprising: onboarding a user account associated with the client location; and receiving VPN credentials for the bare metal server from the user account, wherein the VPN credentials enable one or more workers of the cloud native application to remotely communicate with the bare metal server.

Example 4 is a method as in any of Examples 1-3, further comprising remotely installing a containerized workload management system on the bare metal server.

Example 5 is a method as in any of Examples 1-4, further comprising remotely installing software for a multi-data center automation platform on the bare metal server.

Example 6 is a method as in any of Examples 1-5, wherein remotely installing the operating system on the bare metal server comprises installing without communicating with a dynamic host configuration protocol (DHCP) server at the client location.

Example 7 is a method as in any of Examples 1-6, wherein remotely installing the operating system on the bare metal server further comprises installing without communicating with a trivial file transfer protocol (TFTP) server at the client location or a hypertext transfer protocol (HTTP) server at the client location.

Example 8 is a method as in any of Examples 1-7, further comprising communicating with the bare metal server by way of a virtual private network (VPN) connection enabling communication between the cloud native platform and the bare metal server.

Example 9 is a method as in any of Examples 1-8, wherein remotely installing the operating system on the bare metal server comprises installing only by way of the VPN connection and without locally installing the operating system at the client location.

Example 10 is a method as in any of Examples 1-9, further comprising adding a unique identifier for the VPN connection to a schema for the bare metal server.

Example 11 is a system including one or more processors each configured to execute instructions stored in non-transitory computer readable storage medium, the instructions comprising any of the method steps of Examples 1-10.

Example 12 is non-transitory computer readable storage medium storing instructions for execution by one or more processors, the instructions comprising any of the method steps of Examples 1-10.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that any features of the above-described arrangements, examples, and embodiments may be combined in a single embodiment comprising a combination of features taken from any of the disclosed arrangements, examples, and embodiments.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
registering a bare metal server with a cloud native platform, wherein the bare metal server is located on-premises at a client location;
remotely installing an operating system on the bare metal server from the cloud native platform;
remotely installing an orchestration software on the bare metal server from the cloud native platform, wherein the orchestration software receives commands from the cloud native platform and orchestrates installation of the operating system on a plurality of other bare metal servers located on-premises at the client location; and
causing the bare metal server to install the operating system on the plurality of other bare metal servers located on-premises at the client location via the orchestration software.

2. The method of claim 1, wherein registering the bare metal server comprises registering based on one or more of a baseboard management controller (BMC) Internet Protocol (IP) address, a BMC username, a BMC password, or Virtual Private Network (VPN) credentials for the bare metal server.

3. The method of claim 1, further comprising:
onboarding a user account associated with the client location; and
receiving Virtual Private Network (VPN) credentials for the bare metal server from the user account, wherein the VPN credentials enable one or more workers of the cloud native platform to remotely communicate with the bare metal server.

4. The method of claim 1, further comprising remotely installing a containerized workload management system on the bare metal server.

5. The method of claim 1, further comprising remotely installing software for a multi-data center automation platform on the bare metal server.

6. The method of claim 1, wherein the remotely installing the operating system on the bare metal server comprises installing without communicating with a dynamic host configuration protocol (DHCP) server at the client location.

7. The method of claim 6, wherein the remotely installing the operating system on the bare metal server further comprises installing without communicating with a trivial file transfer protocol (TFTP) server at the client location or a hypertext transfer protocol (HTTP) server at the client location.

8. The method of claim 1, further comprising communicating with the bare metal server by way of a virtual private network (VPN) connection enabling communication between the cloud native platform and the bare metal server.

9. The method of claim 8, wherein the remotely installing the operating system on the bare metal server comprises installing only by way of the VPN connection and without locally installing the operating system at the client location.

10. The method of claim 8, further comprising adding a unique identifier for the VPN connection to a schema for the bare metal server.

11. A system comprising:
one or more processors; and
non-transitory computer readable storage medium storing instructions, wherein the instructions, when executed by the one or more processors, to perform operations comprising:
registering a bare metal server with a cloud native platform, wherein the bare metal server is located on-premises at a client location;
remotely installing an operating system on the bare metal server from the cloud native platform;
remotely installing an orchestration software on the bare metal server from the cloud native platform, wherein the orchestration software receives commands from the cloud native platform and orchestrates installation of the operating system on a plurality of other bare metal servers located on-premises at the client location; and causing the bare metal server to install the operating system on the plurality of other bare metal servers located on-premises at the client location via the orchestration software.

12. The system of claim 11, wherein the operations further comprise:

registering the bare metal server comprises registering based on one or more of a baseboard management controller (BMC) Internet Protocol (IP) address, a BMC username, a BMC password, or Virtual Private Network (VPN) credentials for the bare metal server.

13. The system of claim 11, wherein the operations further comprise:

onboarding a user account associated with the client location; and receiving Virtual Private Network (VPN) credentials for the bare metal server from the user account, wherein the VPN credentials enable one or more workers of the cloud native platform to remotely communicate with the bare metal server.

14. The system of claim 11, wherein the operations further comprise remotely installing a containerized workload management system on the bare metal server.

15. The system of claim 11, wherein the operations further comprise remotely installing software for a multi-data center automation platform on the bare metal server.

16. The system of claim 11, wherein remotely installing the operating system on the bare metal server comprises installing without communicating with a dynamic host configuration protocol (DHCP) server at the client location.

17. The system of claim 16, wherein remotely installing the operating system on the bare metal server further comprises installing without communicating with a trivial file transfer protocol (TFTP) server at the client location or a hypertext transfer protocol (HTTP) server at the client location.

18. The system of claim 11, wherein the operations further comprise communicating with the bare metal server by way of a virtual private network (VPN) connection enabling communication between the cloud native platform and the bare metal server.

19. The system of claim 18, wherein the operations further comprise installing the operating system on the bare metal server comprises installing only by way of the VPN connection and without locally installing the operating system at the client location.

20. The system of claim 18, wherein the operations further comprise adding a unique identifier for the VPN connection to a schema for the bare metal server.

* * * * *